(12) United States Patent
Trummer

(10) Patent No.: US 7,095,944 B2
(45) Date of Patent: Aug. 22, 2006

(54) DISTANCE MEASURING DEVICE AND METHOD FOR DETERMINING A DISTANCE

(75) Inventor: Günther Trummer, Baiersdorf (DE)

(73) Assignee: Mikrowellen-Technologie und Sensoren GmbH, Ottobrunn (DE)

( * ) Notice: Subject to any disclaimer, the term of this patent is extended or adjusted under 35 U.S.C. 154(b) by 0 days.

(21) Appl. No.: 10/504,618

(22) PCT Filed: May 21, 2003

(86) PCT No.: PCT/EP03/00894

§ 371 (c)(1),
(2), (4) Date: May 4, 2005

(87) PCT Pub. No.: WO03/069269

PCT Pub. Date: Aug. 21, 2003

(65) Prior Publication Data
US 2005/0191027 A1 Sep. 1, 2005

(30) Foreign Application Priority Data
Feb. 13, 2002 (DE) ................................ 102 05 904

(51) Int. Cl.
*G02B 6/00* (2006.01)
(52) U.S. Cl. .................... 385/147; 385/12; 343/635
(58) Field of Classification Search ................ 385/147, 385/12; 343/635
See application file for complete search history.

(56) References Cited

U.S. PATENT DOCUMENTS

| | | | | |
|---|---|---|---|---|
| 3,940,608 A | * | 2/1976 | Kissinger et al. | 250/227.28 |
| 4,901,628 A | | 2/1990 | Krage | |
| 5,073,027 A | * | 12/1991 | Krohn et al. | 356/624 |
| 5,625,459 A | * | 4/1997 | Driver | 356/446 |
| 6,359,445 B1 | * | 3/2002 | Pfizenmaier et al. | 324/636 |
| 6,445,193 B1 | * | 9/2002 | Trummer et al. | 324/644 |
| 6,959,481 B1 | * | 11/2005 | Moreland et al. | 29/592.1 |

FOREIGN PATENT DOCUMENTS

| | | |
|---|---|---|
| DE | 198 33 220 A1 | 6/1999 |
| DE | 198 00 306 A1 | 7/1999 |
| DE | 199 03 183 A1 | 3/2001 |
| DE | 199 44 103 A1 | 3/2002 |
| EP | 0 935 127 A | 8/1999 |

* cited by examiner

*Primary Examiner*—Ellen E. Kim
(74) *Attorney, Agent, or Firm*—Dean D. Small; The Small Patent Law Group LLP

(57) ABSTRACT

The invention relates to a distance measuring device and a suitable method for determining a distance which provides for continuous determination of the distance—which can therefore also be made discrete—and in addition is easy to handle and provides for a large variety of applications. The distance measuring device comprises analytical electronics and a sensor facility, which comprises at least one coupling probe for feeding an emitted signal into a conducting structure with reflection body. Moreover, the conducting structure comprises a feeding block with a feeding area connecting an HF transceiver via a wave guide with dielectric support system to the coupling probe.

29 Claims, 1 Drawing Sheet

DISTANCE MEASURING DEVICE AND METHOD FOR DETERMINING A DISTANCE

CROSS REFERENCE TO RELATED APPLICATIONS

This Application claims the benefit of PCT Patent Application Number PCT/EP03/00894, filed Jan. 29, 2003, and German application DE 102 05 904.7 filed Feb. 13, 2002 which are hereby incorporated by reference in their entirety.

The present invention relates generally to a distance measuring device and a method for determining a distance.

BACKGROUND OF THE INVENTION

For the detection and recording of the position of the piston of fluidic linear drives or pneumatic and hydraulic cylinders as the conducting structure, it is generally known to use distance measuring devices measuring the distance between the piston serving as a reflecting body inside the conducting structure and the cylinder lid or bottom of the conducting structure. The detection of the piston position in cylinders can be performed either discrete, i.e. at discrete sites, or continuous, i.e. continuously during operation.

A discrete determination of piston position is usually applied in order to feedback the performance or completion of a piston movement to a process control (e.g. SPS), for example in order to be able to initiate the next process step. Magnetic field-sensitive sensors or sensor facilities are used predominantly for this purpose, which detect the magnetic field of a permanent magnet residing on the cylinder piston. The sensors used for detection are mounted to the outside of the cylinder tube. When the piston moves into the detection area of a sensor of this type, the sensor detects the presence of the cylinder piston through the cylinder tube. In the majority of cases, this requires the use of non-ferromagnetic materials and thus limits the design properties and/or applications of the drive. However, if a different position of the piston is to be detected, the sensor needs to be mechanically adjusted or newly adjusted accordingly. Therefore, an additional sensor must be mounted for each additional position to be detected, which is associated with additional material, mounting, adjustment, and installation costs in each case.

Another disadvantage is that the mounting usually is performed on customer premises. The situation is aggravated if the cylinder is already assembled in a machine that is difficult to access such that it may be impossible to adjust the sensing distances by mechanical shifting of the externally mounted magnetic switches. Moreover, these externally mounted sensors require additional space. Often additional design work is required in order to provide for the accessibility and robustness of the sensor.

Sensors of this type are implemented predominantly in the form of magnetic field-sensitive sensors and are known as Reed switches, magneto-resistive (MR), giant magneto-resistive (GMR), Hall switches or magneto-inductive proximity switches. However, the detection of the magnetic field requires extensive adjustment of the magnet to the sensor and/or sensor facility. Moreover, this measuring principle limits the possible applications because of interfering static or dynamic magnetic fields (EMV, field of a cylinder in close proximity) and the temperature properties of the sensor.

For continuous piston position measurement, it is common to use measuring systems based on potentiometry, the linear variable differential transformer (LVDT) principle or the ultrasound principle. In these systems, the position of the piston is output continuously and, in the majority of cases, as an analogous voltage signal. Sensors working according to the LVDT principle always require a calibration run for pre-adjustment after being turned on. Ultrasound sensors are suitable only to a limited degree for path length measurements in pneumatic or hydraulic cylinders, since the accuracy of measurement changes with cylinder pressure. Incremental path length measurements supplementing these systems are also known. These systems are implemented for example by coding the piston rod and thus can be used only for relative path length measurements.

In summary, both the continuous and the discrete determination of piston position according to the prior art can be integrated into a cylinder either not at all or only with substantial design efforts which are associated with high costs. Substantial design efforts are required because all common sensor principles described above must be adjusted to the respective cylinder length, since their detection area is too short.

It is desirable to create a distance measuring device and a method for determining the distance, which overcome the disadvantages listed above and provide for continuous determination of the distance—which can therefore also be made discrete—and in addition is easy to handle and provides for a large variety of applications.

BRIEF DESCRIPTION OF THE INVENTION

According to one embodiment of the invention, a conducting structure is provided, which comprises a feeding block with a feeding area connecting an HF transceiver via a wave guide with dielectric support systems with the coupling probe. This arrangement according to the invention provides for the complete integration of the coupling probe including analytical electronics in the lid of the cylinder. Additional parts to me mounted externally are not required. The corresponding sensing distances can be set externally by means of an electronic interface, preferably by the analytical electronics. As a matter of principle, the distance measuring device according to the invention is universally applicable independent of the length of the cylinder. Moreover, it has become apparent that the measuring results are reliably correct independent of the pressure, oil, and humidity inside the cylinder.

According to another embodiment of the invention, a distance measuring device and a method for determining a distance are provided, whereby the sensor facility comprises a high frequency feeding system whose function is to measure a certain distance, for example inside a conducting structure (the conducting structure is for example the inner space of the pneumatic cylinder=circular wave guide) by emitting and receiving waves, for example by integrating the feeding system into the conducting structure. Due to this integration of the feeding system, the distance measuring device can be build very small in size and requires almost no or little modification. Consequently, the entire assembly of the distance measuring device according to the invention can have a clean, smooth design, since no mounting of external sensor facilities is needed, and/or does not modify the external appearance. The distance measuring device according to the invention provides for savings of installation costs, since the premade cylinder comprises only a connecting cable for the excitation and the recording of data. According to the method according to the invention, the length of the conducting structure is measured up to a short-circuit (e.g. the piston as reflection body in pneumatic or hydraulic cylinder), the position of which can be varied. The emitted signal provided according to the method according to the invention is fed into a conducting structure and reflected preferably by a short-circuit, for example by a cylinder piston serving as reflection body. Therefore, the measurement captures the distance between the feeding point defined by the coupling probe and the short-circuit of the conducting structure. The distance to be measured is determined by measuring the phase difference between the emitted and the received signal.

Measuring the distance between the feeding points defined by the coupling probe and the reflection body through the use of at least two emitted signals in the form of electromagnetic waves differing in frequency, the position can be measured unambiguously, provided the conducting structure to be measured is smaller than half the wavelength that is employed. In this context it is important to note that, independent of the selected feeding, at least three measuring frequencies can be selected for unambiguous determination of position. However, in practical applications, it has proven advantageous to use four frequencies, especially since doing so improves the error tolerance of the algorithm.

A dielectric secondary ring serves as a limit stop safety device for the moving reflection body and has been taken into consideration in the electromagnetic design of the feeding system.

It proved to be particularly advantageous to provide the conducting structure in the form of a circular wave guide, such as a cylinder with a piston as the reflection body. For example a pneumatic cylinder or a hydraulic cylinder can provide a circular wave guide of this type. Thus, the prior disadvantages are overcome in particular for these applications.

Providing bore holes in the feeding block allowing the insertion of the support system, the coupling probe, and the coaxial feeding area renders the mounting simple and the entire distance measuring device can be integrated into existing conducting structure virtually without limitations.

The coupling probe also may be provided as a monopole excitation system and the electromagnetic wave to be fed-in coaxially such that a circular wave guide wave can be fed-in and converted to the monopole by a multi-step coaxial transformation step. The use of the multi-step coaxial transformation step, which can have a planar base area, in the middle of which an electrically conductive cylinder is provided, and next to which is an electrically conductive pin as the inner conductor of the coaxial feeding, ensures that the entire feeding is simple.

The support system consists of a dielectric, e.g. Lexan, and serves to position the coupling probe inside the cylinder. In addition, it provides for the required mechanical stability in the presence of a pressure load (e.g. 10 bar in the pneumatic cylinder). The feeding block is particularly cost-efficient to implement in mass production by inserting the monopole excitation system in the lid of the cylinder, while the dielectric support system firmly connects this to the cylinder lid by means of a plastic jet molding procedure.

An electromagnetic wave with a high frequency of between 1 to 25 GHz may be provided in. Depending on the dimensions and/or gauging of the cylinder used as the conducting structure and the wave mode, a suitably frequency above the lower limit frequency of the wave mode employed, is selected.

DETAILED DESCRIPTION OF THE INVENTION

Figure 1:
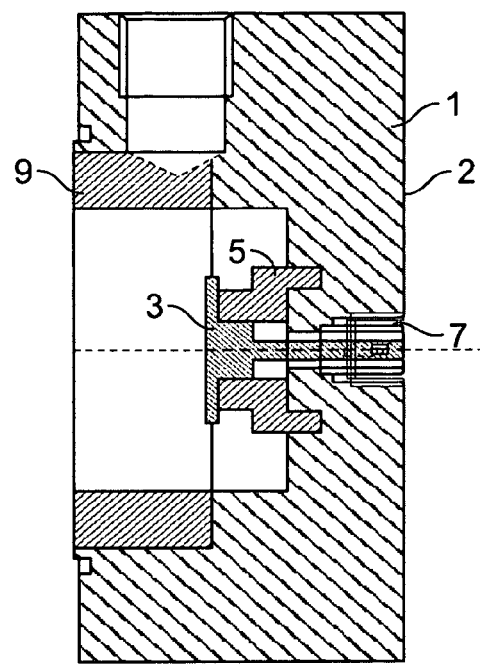
FIG. 1 shows a sectional view of the distance measuring device in an assembled conducting structure.

FIG. 1 shows the distance measuring device according to an embodiment of the invention with conducting structure 1 and feeding block with feeding area 2, whereby the feeding area comprises a coupling probe 3 by means over a dielectric support system 5 with the wave guide 7. Also shown is the dielectric secondary ring 9 which serves, on one hand, as a mechanical limit stop safety device and, on the other hand, as secondary adjustment and emission system.

Figure 2:
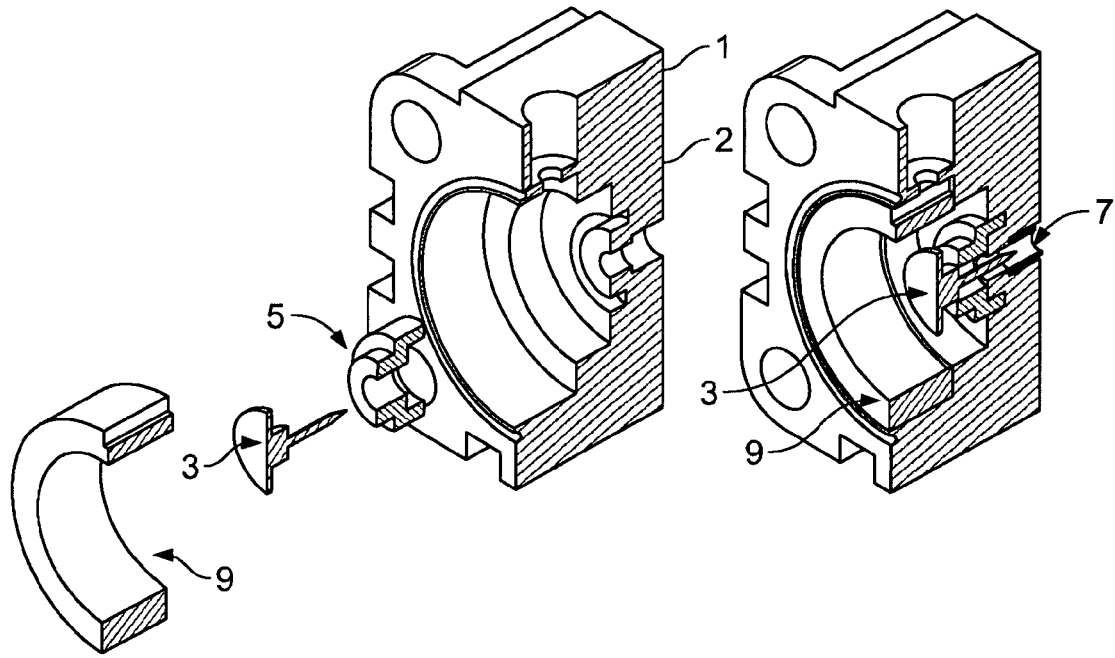
FIG. 2 shows a perspective exploded view of the distance measuring device according to the invention (left side) and of the distance measuring device according to the invention in the assembled state (right side).

The individual components of the distance measuring device according to an embodiment of the invention are shown more clearly in FIG. 2, whereby the essential components, such as feeding block with a feeding area 2 are shown in an exploded view. It is also clearly evident therefrom that the dielectric support system supports the coupling probe 3, which is implemented in the form of a monopole excitation system and contains a pin which can be received in a coaxial wave guide. The dielectric secondary ring 9 is also shown.

For the purpose of clarity, the function of the distance measuring device and method for measuring the distance according to the invention shall be illustrated in more detail in the following.

The feeding system consists of a coaxial monopole excitation system. By feeding-in a transverse electromagnetic wave, i.e. TEM wave, in the coaxial feeding or input area 3, the monopole system excites a circular wave guide wave with the characteristic E-field type of the E01 wave. This wave propagates inside the propagation cylinder in axial direction. When the wave encounters a reflection body, i.e. the piston in the case of a pneumatic and hydraulic cylinder, the wave is reflected and converted into the coaxial guiding system by the excitation section (monopole) and transmitted to a HF receiver (emission and reception unit). The monopole feeding consists of a multi-step coaxial transformation step acting as coupling probe 3 with a dielectric support system 5 for position and pressure stabilization. A second dielectric ring or secondary ring 9 in the emission area of the monopole, made for example from Lexan, serves as a mechanical limit stop device for the piston and was taken into consideration as a secondary adjustment and emission system in the electrical design of the monopole.

The method according to the invention shall be illustrated in the following using a pneumatic cylinder as an example. In this case, the entire pneumatic cylinder, from piston rod to rear lid, is considered a circular wave guide. In accordance with the geometric dimensions of the cylinder, the emission frequency of the sensor is selected such that mono-mode propagation of the electromagnetic wave is possible (in E01 mode in the example) with the excitation of circular wave guide waves of higher modes being prevented. The excitation of circular wave guide waves of lower modes is prevented by the feeding geometry. The electromagnetic wave inside the cylinder is excited for example by a monopole of the type described above. In accordance with the reflectometer principle, the wave propagates in the circular wave guide (=pneumatic cylinder) and is reflected at the piston (=short-circuit). In order to be able to measure the distance between the piston and the coupling probe continuously, the emitted signal must be modulated. This can be done by means of frequency modulation. However, in order to achieve high resolution in the distance measurement, it is necessary to use a large frequency deviation. More advantageous in practical applications is the emission of a CW signal, e.g. at three different frequencies, for example: 5.8 GHz, 6.0 GHz, 6.2 GHz to define an unambiguous distance area and subsequently analyze the phase difference between the emitted and the received signal as a highly accurate reading of the distance between coupling probe and piston. The number of frequencies to use and their position depend mainly on the maximal distance to be measured as well as the required error tolerance as compared to the phase angle measurement. In general, the maximally measurable distance is larger when the difference between two measuring frequencies is small, but the distinction of two consecutive periods requires that the phase angle measurement is more accurate than when the difference between the frequencies is larger. Hence, the immunity to interference is higher when the difference between the individual measuring frequencies is larger.

For the measurement of a large measuring range with sufficient immunity to interference, it is necessary to use multiple measuring frequencies with suitable frequency positions. This necessitates the use of pairs of frequencies with a small difference in emission frequency (large measuring range) and pairs of frequencies with large difference in frequency (immunity to interference).

The positional accuracy is mainly determined by the accuracy of the phase angle measurement at the highest measuring frequency, since the wavelength is shortest at this frequency. The following equation applies:

Change in path length=phase angle change×wavelength/180°

The determination of piston position by means of microwaves is based on the following principle: an electromagnetic wave of a suitable frequency is launched into the cylinder. The cylinder itself serves as the conducting structure for the wave. The wave is propagated in the cylinder until it encounters the piston serving as the reflection body. The largest part of the electromagnetic wave is reflected at the piston, since the piston show an electrical behavior much like a short-circuit. The reflected wave returns through the cylinder and is received from the cylinder by the same structure used for launching. The phase angle between the launched and the reflected signal is then measured. If the piston changes position, the path length traveled by the electromagnetic wave inside the piston also changes. The change in path length causes a change in the signal propagation delay and therefore also a change in the phase angle between incoming and reflected wave. Therefore, the phase angle between incoming and reflected signal can be used as a measure of the position of the piston. The relationship between piston position and phase angle $\varphi$ is described by the following equation:

$$\varphi = \frac{2x * 360°}{\lambda} + \varphi_0$$

in which $\varphi_0$ is a phase offset, which is determined mainly by the supply lines and the launching. $\varphi_0$ is constant and thus has no influence on the actual measurement of position. The equation shown above also determines the accuracy of the phase measurement that is required to be able to achieve a predetermined accuracy in the position measurement.

Since it is not possible in a phase measurement to distinguish between phase angles of $\varphi$ and $\varphi+n\times360°$ as a matter of principle, the use of only one frequency would allow measurements on cylinders only up to a maximal piston stroke $<\lambda/2$. In contrast, the use of two or more frequencies allows measurements on pistons with substantial larger length to be made. If two frequencies are used, the wavelengths must not be too different. The following applies to the wavelengths for a cylinder of length 1:

$$\lambda_1 > \lambda_2 > \frac{2l\lambda_1}{2l+\lambda_1}$$

Since the phase angle of the reflected signal cannot be measured directly such that the voltage measured at a mixing transformer output is not directly proportional to the piston position, a suitable algorithm for the position search is needed. Since the output signals is repeated periodically, it is most important to ensure that the position search proceeds unambiguously, i.e. it must be possible to determine unambiguously which period the piston is in. One possibility for determining the position involves recording many measuring values during a frequency sweep. These measuring values are subsequently transformed into the frequency domain by means of a FFT or DFT. The position of the peak of the spectrum thus generated can then be used to determine the position of the piston. As long as no sub-sampling is permitted during the recording of the measuring values, any ambiguity is excluded in this procedure. Moreover, piston position values are obtained in this procedure without having to record a position table. As a disadvantage, the procedure requires the recording of a relatively large number of measuring values and relatively extensive calculation efforts.

Another possibility is to measure at few frequencies only and determine the position of the piston by means of position tables. This simply involves a comparison of the measured values to the values of the points in the position table. The position thus determined corresponds to the value in the table which corresponds most closely to the measured values. A disadvantage of this procedure is that it may be associated with ambiguities. Since a direct phase measurement is not performed, ambiguity cannot be prevented by complying with the condition shown above. Detailed investigations show that the use of only two measuring frequencies always results in points with identical measured values if the length of the cylinder exceed $\lambda/2$. Since this will be the case in most practical applications, it is advisable to work with at least three frequencies. If the three frequencies are selected wisely, there will no longer be positions in which all three measured values are identical. However, the values measured at two piston positions must differ by a minimal difference in order to ensure the lack of ambiguity in the presence of certain measuring errors. It may therefore be advantageous to use more than three frequencies, especially when working with large cylinder lengths. This provides the additional benefit of greater measuring accuracy since the noise or measuring error occurring at only one frequency are suppressed.

The invention claimed is:

1. A distance measuring device with analytical electronics and a sensor facility having at least one coupling probe for providing an emitted signal into a conducting structure with reflection body, the conducting structure comprising: a feeding block with a feeding area connecting an HF transceiver via a wave guide with dielectric support system to the coupling probe, wherein
at least two emitted signals are emitted by the coupling probe in the form of electromagnetic waves with different frequencies.

2. A distance measuring device according to claim 1, further comprising a dielectic secondary ring.

3. A distance measuring device according to claim 1, wherein the conducting structure comprises a circular wave guide with the reflection body comprising a cylinder with piston.

4. A distance measuring device according to claim 1 wherein the feeding block comprises bore holes, in which the support system, the coupling probe, and the coaxial feeding area are insertable.

5. A distance measuring device according to claim 1, wherein the coupling probe comprises a monopole excitation system and the electromagnetic wave is provided coaxially and converted to the monopole by a multi-step coaxial transformation.

6. A distance measuring device according to claim 1, wherein the coupling probe comprises a triple-step transformation module with a planar base area having a cylinder in a middle of the planar base area and a pin adjacent the cylinder to connect the feeding area to the coupling probe.

7. A distance measuring device according to claim 1, wherein the emitted signal comprises a high frequency electromagnetic wave provided by the coupling probe.

8. A distance measuring device according to claim 7, wherein the electromagnetic wave is provided at a high frequency of between about 1 GHz and about 25 GHz.

9. A distance measuring device according to claim 1, wherein the conducting structure comprises a coaxial structure and the electromagnetic wave is configured to propagate monomodial in a TEM mode.

10. A distance measuring device according to claim 1, wherein the wave guide comprises a circular wave and guide the electromagnetic wave is configured to propagate monomodial in an E01 mode.

11. A distance measuring device according to claim 1, wherein the sensor facility comprises high-frequency electronics with an emission and a reception branch.

12. A method for determining a distance a distance measuring device said method comprising
a) providing a conducting structure with a reflection body, having a feeding block with a feeding area connecting an HF transceiver via a wave guide with a dielectric support system to the coupling probe, and
b) measuring the distance between the feeding point defined by the coupling probe and the reflection body, wherein at least two emitted signals by the coupling probe in the form of electromagnetic waves with different frequencies.

13. A method according to claim 12, wherein the measurement of the distance comprises analyzing the phase difference between the emitted signal and the received signal of the electromagnetic wave.

14. A method according to claim 12, wherein the difference between at least two emission frequencies of the corresponding electromagnetic wave is about 1%.

15. A method according to claim 12, wherein the difference in the frequencies of the emitted signal of the corresponding electromagnetic wave is 20%.

16. A method according to claim 12, wherein the emitted signals are emitted continuously.

17. A method according to claim 12, wherein three emitted signals are emitted as electromagnetic waves by the coupling probe.

18. A distance measuring device with analytical electronics and a sensor facility, having at least one coupling probe for providing an emitted signal into a conducting structure with reflection body, the conducting structure comprising: a feeding block with a feeding area connecting an HF transceiver via a wave guide with a dielectric support system to the coupling probe, wherein the coupling probe comprises a triple-step transformation module with a planar base area in having a cylinder in a middle of the planar base area, and a pin adjacent the cylinder to correct the feeding area to the coupling probe.

19. A distance measuring device according to claim 18, further comprising a dielectric secondary ring.

20. A distance measuring device according to claim 18, wherein the conducting structure comprises a circular wave guide, with the reflection body comprising a cylinder with piston.

21. A distance measuring device according to claim 18, wherein the feeding block comprises bore holes, in which the support system, the coupling probe, and the coaxial feeding area are insertable.

22. A distance measuring device according to claim 18, wherein the coupling probe comprises a monopole excitation system and the electromagnetic wave is provided coaxially and converted to the monopole by a multi-step coaxial transformation.

23. A distance measuring device according to claim 18, wherein the coupling probe comprises a triple-step transformation module.

24. A distance measuring device according to claim 18, wherein the emitted signal comprises a high frequency electromagnetic wave provided by means the coupling probe.

25. A distance measuring device according to claim 24, wherein the electromagnetic wave provided at a high frequency of between about 1 GHz and about 25 GHz.

26. A distance measuring device according to claim 18, wherein at least two emitted signals are emitted by the coupling probe in the form of electromagnetic waves with different frequencies.

27. A distance measuring device according to claims 18, wherein the conducting structure comprises a coaxial structure and the electromagnetic wave propagate monomodal in a TEM mode.

28. A distance measuring device according to claim 18, wherein the wave guide comprises a circular wave guide and the electromagnetic wave is configured to propagate momomodal in an E01 mode in the case of a circular wave guide.

29. A distance measuring device according to claim 18, wherein the sensor facility comprises high-frequency electronics with an emission and a reception branch.

* * * * *

UNITED STATES PATENT AND TRADEMARK OFFICE
CERTIFICATE OF CORRECTION

| | | |
|---|---|---|
| PATENT NO. | : 7,095,944 B2 | Page 1 of 1 |
| APPLICATION NO. | : 10/504618 | |
| DATED | : August 22, 2006 | |
| INVENTOR(S) | : Trummer | |

It is certified that error appears in the above-identified patent and that said Letters Patent is hereby corrected as shown below:

TITLE PG (ITEM 22)
The International Filing date is 29 January 2003 instead of 21 May 2003.

Signed and Sealed this

Nineteenth Day of December, 2006

JON W. DUDAS
*Director of the United States Patent and Trademark Office*